(12) United States Patent
Hall et al.

(10) Patent No.: US 12,376,722 B2
(45) Date of Patent: Aug. 5, 2025

(54) ROBOTIC CLEANER

(71) Applicant: SHARKNINJA OPERATING LLC, Needham, MA (US)

(72) Inventors: Robert T. Hall, Franklin, TN (US); Alex Irkliy, Portland, TN (US); Heena Mordani, Brookline, MA (US)

(73) Assignee: SharkNinja Operating LLC, Needham, MA (US)

(*) Notice: Subject to any disclaimer, the term of this patent is extended or adjusted under 35 U.S.C. 154(b) by 114 days.

(21) Appl. No.: 17/886,877

(22) Filed: Aug. 12, 2022

(65) Prior Publication Data
US 2023/0046417 A1 Feb. 16, 2023

Related U.S. Application Data

(60) Provisional application No. 63/232,997, filed on Aug. 13, 2021.

(51) Int. Cl.
A47L 11/40 (2006.01)
G05D 1/00 (2024.01)

(52) U.S. Cl.
CPC ........ A47L 11/4011 (2013.01); G05D 1/0038 (2013.01); G05D 1/0044 (2013.01); G05D 1/0274 (2013.01); A47L 2201/04 (2013.01)

(58) Field of Classification Search
None
See application file for complete search history.

(56) References Cited

U.S. PATENT DOCUMENTS 4,846,297 A 7/1989 Field et al.
5,402,051 A 3/1995 Fujiwara et al.
5,867,800 A 2/1999 Leif
6,459,955 B1 10/2002 Bartsch et al.
6,584,376 B1 6/2003 Van Kommer
(Continued)

FOREIGN PATENT DOCUMENTS

CN 1759798 4/2006
CN 1765595 5/2006
(Continued)

OTHER PUBLICATIONS

US 8,271,129 B2, 09/2012, Halloran et al. (withdrawn)
(Continued)

Primary Examiner — Thomas S McCormack
(74) Attorney, Agent, or Firm — Grossman Tucker Perreault & Pfleger, PLLC

(57) ABSTRACT

A robotic cleaning system may include a robotic cleaner configured to generate a map of an environment and a mobile device configured to communicatively couple to the robotic cleaner, the robotic cleaner configured to communicate the map to the mobile device. The mobile device may include a camera configured to generate an image of the environment, the image comprising a plurality of pixels, a display configured to display the image and to receive a user input while displaying the image, the user input being associated with one or more of the plurality of pixels, a depth sensor configured to generate depth data that is associated with each pixel of the image, an orientation sensor configured to generate orientation data that is associated with each pixel of the image, and a mobile controller configured to localize the mobile device within the map using the depth data and the orientation data.

17 Claims, 4 Drawing Sheets

(56) References Cited

U.S. PATENT DOCUMENTS

| | | |
|---|---|---|
| 6,629,028 B2 | 9/2003 | Paromtchik et al. |
| 6,845,297 B2 | 1/2005 | Allard |
| 6,968,592 B2 | 11/2005 | Takeuchi et al. |
| 7,024,278 B2 | 4/2006 | Chiappetta et al. |
| 7,117,067 B2 | 10/2006 | McLurkin et al. |
| 7,239,105 B2 | 7/2007 | Lim et al. |
| 7,388,343 B2 | 6/2008 | Jones et al. |
| 7,499,804 B2 | 3/2009 | Svendsen et al. |
| 7,526,362 B2 | 4/2009 | Kim et al. |
| 7,706,917 B1 | 4/2010 | Chiappetta et al. |
| 7,805,220 B2 | 9/2010 | Taylor et al. |
| 7,916,931 B2 | 3/2011 | Lee et al. |
| 7,996,126 B2 | 8/2011 | Hong |
| 8,019,223 B2 | 9/2011 | Hudson et al. |
| 8,160,746 B2 | 4/2012 | Wang et al. |
| 8,195,331 B2 | 6/2012 | Myeong et al. |
| 8,457,789 B2 | 6/2013 | Hong et al. |
| 8,463,436 B2 | 6/2013 | Jeong et al. |
| 8,508,388 B2 | 8/2013 | Karlsson et al. |
| 8,515,578 B2 | 8/2013 | Chiappetta et al. |
| 8,577,538 B2 | 11/2013 | Lenser et al. |
| 8,606,404 B1 | 12/2013 | Huffman et al. |
| 8,780,342 B2 | 7/2014 | DiBernardo et al. |
| 8,798,792 B2 | 8/2014 | Park et al. |
| 8,798,840 B2 | 8/2014 | Fong et al. |
| 8,874,300 B2 | 10/2014 | Allard et al. |
| 8,930,023 B2 | 1/2015 | Gutmann et al. |
| 8,972,052 B2 | 3/2015 | Chiappetta |
| 8,972,061 B2 | 3/2015 | Rosenstein et al. |
| 8,983,661 B2 | 3/2015 | Cho et al. |
| 9,002,511 B1 | 4/2015 | Hickerson et al. |
| 9,008,835 B2 | 4/2015 | Dubrovsky et al. |
| 9,020,637 B2 | 4/2015 | Schnittman |
| 9,026,302 B2 | 5/2015 | Stout et al. |
| 9,037,294 B2 | 5/2015 | Chung et al. |
| 9,037,396 B2 | 5/2015 | Pack et al. |
| 9,110,471 B2 | 8/2015 | Pack et al. |
| 9,146,560 B2 | 9/2015 | Burnett et al. |
| 9,149,167 B2 | 10/2015 | Hong et al. |
| 9,149,170 B2 | 10/2015 | Ozick et al. |
| 9,215,957 B2 | 12/2015 | Cohen et al. |
| 9,250,081 B2 | 2/2016 | Gutmann et al. |
| 9,254,571 B2 | 2/2016 | Hyung et al. |
| 9,278,690 B2 | 3/2016 | Smith |
| 9,280,158 B2 | 3/2016 | Bron et al. |
| 9,310,806 B2 | 4/2016 | Romanov et al. |
| 9,357,893 B2 | 6/2016 | Lee |
| 9,402,518 B2 | 8/2016 | Burlutskiy |
| 9,423,798 B2 | 8/2016 | Liu et al. |
| 9,427,875 B2 | 8/2016 | Goel et al. |
| 9,456,725 B2 | 10/2016 | Kim et al. |
| 9,519,289 B2 | 12/2016 | Munich et al. |
| 9,613,308 B2 | 4/2017 | Izhikevich et al. |
| 9,629,514 B2 | 4/2017 | Hillen et al. |
| 9,630,317 B2 | 4/2017 | Izhikevich et al. |
| 9,675,226 B2 | 6/2017 | Kim et al. |
| 9,675,229 B2 | 6/2017 | Kwak et al. |
| 9,740,209 B2 | 8/2017 | Nakano et al. |
| 9,840,003 B2 | 12/2017 | Szatmary et al. |
| 9,868,211 B2 | 1/2018 | Williams et al. |
| 9,904,284 B2 | 2/2018 | Kwak et al. |
| 9,911,226 B2 | 3/2018 | Hillen et al. |
| 9,950,429 B2 | 4/2018 | Kim et al. |
| 9,983,592 B2 | 5/2018 | Hong et al. |
| 10,052,004 B2 | 8/2018 | Kim et al. |
| 10,058,224 B2 | 8/2018 | Kim et al. |
| 10,105,028 B2 | 10/2018 | Noh et al. |
| 10,268,189 B2 | 4/2019 | Yan |
| 10,291,765 B2 | 5/2019 | So et al. |
| 10,373,389 B2 | 8/2019 | Jung |
| 10,499,782 B2 | 12/2019 | Jung |
| 10,575,699 B2 | 3/2020 | Bassa et al. |
| 11,213,177 B2 | 1/2022 | Tonderys et al. |
| 11,397,437 B2 | 7/2022 | Arnold et al. |
| 2004/0236468 A1 | 11/2004 | Taylor et al. |
| 2004/0244138 A1 | 12/2004 | Taylor et al. |
| 2005/0007057 A1 | 1/2005 | Peless et al. |
| 2005/0010331 A1 | 1/2005 | Taylor et al. |
| 2005/0273967 A1 | 12/2005 | Taylor et al. |
| 2006/0095158 A1 | 5/2006 | Lee et al. |
| 2009/0144931 A1 | 6/2009 | Milligan |
| 2013/0058635 A1 | 3/2013 | Vrdoljak |
| 2013/0152337 A1 | 6/2013 | Thorne |
| 2014/0129170 A1 | 5/2014 | Ramachandran et al. |
| 2014/0150201 A1 | 6/2014 | McGee |
| 2014/0350839 A1 | 11/2014 | Pack et al. |
| 2015/0013102 A1 | 1/2015 | Bilger |
| 2015/0040340 A1 | 2/2015 | Bilger et al. |
| 2015/0135474 A1 | 5/2015 | Gidwell |
| 2015/0297054 A1 | 10/2015 | Weeks et al. |
| 2015/0335219 A1 | 11/2015 | Noh et al. |
| 2015/0351596 A1 | 12/2015 | Thorne |
| 2016/0128530 A1 | 5/2016 | Thorne et al. |
| 2016/0174793 A1 | 6/2016 | Burke et al. |
| 2016/0220080 A1 | 8/2016 | Thorne |
| 2016/0220081 A1 | 8/2016 | Xu et al. |
| 2016/0220082 A1 | 8/2016 | Thorne et al. |
| 2016/0324388 A1 | 11/2016 | Vrdoljak et al. |
| 2016/0374533 A1 | 12/2016 | Innes et al. |
| 2017/0042319 A1 | 2/2017 | Conrad et al. |
| 2017/0083023 A1 | 3/2017 | Park et al. |
| 2017/0112343 A1 | 4/2017 | Innes et al. |
| 2017/0127896 A1 | 5/2017 | Carter et al. |
| 2017/0144810 A1 | 5/2017 | Birdsell |
| 2017/0150676 A1 | 6/2017 | Yamauchi et al. |
| 2017/0215667 A1 | 8/2017 | Thorne et al. |
| 2017/0273527 A1 | 9/2017 | Han et al. |
| 2017/0344019 A1 | 11/2017 | Haegermarck et al. |
| 2017/0347848 A1 | 12/2017 | Carter et al. |
| 2017/0361456 A1 | 12/2017 | He et al. |
| 2018/0020893 A1 | 1/2018 | Lee et al. |
| 2018/0035854 A1 | 2/2018 | Thorne |
| 2018/0055312 A1 | 3/2018 | Jung |
| 2018/0064301 A1 | 3/2018 | Cottrell et al. |
| 2018/0068815 A1 | 3/2018 | Cottrell |
| 2018/0070785 A1 | 3/2018 | Udy et al. |
| 2018/0092449 A1 | 4/2018 | Strazisar et al. |
| 2018/0232134 A1 | 8/2018 | Ebrahimi Afrouzi et al. |
| 2018/0255991 A1 | 9/2018 | Der Marderosian et al. |
| 2018/0255997 A1 | 9/2018 | So et al. |
| 2018/0263450 A1 | 9/2018 | Kim et al. |
| 2018/0292827 A1 | 10/2018 | Artes et al. |
| 2018/0296046 A1 | 10/2018 | Thorne et al. |
| 2018/0306432 A1 | 10/2018 | Ognjen et al. |
| 2018/0325252 A1 | 11/2018 | Hopke et al. |
| 2018/0338654 A1 | 11/2018 | Kelsey |
| 2018/0338656 A1 | 11/2018 | Carter et al. |
| 2019/0038098 A1 | 2/2019 | Thorne et al. |
| 2019/0059668 A1 | 2/2019 | Thorne et al. |
| 2019/0069740 A1 | 3/2019 | Thorne et al. |
| 2019/0069744 A1 | 3/2019 | Liggett et al. |
| 2019/0090701 A1 | 3/2019 | Tonderys et al. |
| 2019/0090705 A1 | 3/2019 | Thorne et al. |
| 2019/0167059 A1 | 6/2019 | Brown et al. |
| 2019/0191947 A1 | 6/2019 | Freese et al. |
| 2019/0193120 A1 | 6/2019 | Brown et al. |
| 2019/0208979 A1 | 7/2019 | Bassa et al. |
| 2019/0213755 A1 | 7/2019 | Bassa et al. |
| 2019/0246853 A1 | 8/2019 | Sardar et al. |
| 2019/0274500 A1 | 9/2019 | Throne et al. |
| 2019/0274501 A1 | 9/2019 | Antonisami et al. |
| 2019/0302793 A1 | 10/2019 | Leech et al. |
| 2019/0320865 A1 | 10/2019 | Brown et al. |
| 2019/0320866 A1 | 10/2019 | Thorne et al. |
| 2019/0335968 A1 | 11/2019 | Harting et al. |
| 2019/0343349 A1 | 11/2019 | Clare et al. |
| 2019/0357740 A1 | 11/2019 | Thorne et al. |
| 2020/0000298 A1 | 1/2020 | Brown et al. |
| 2020/0019156 A1 | 1/2020 | Drew et al. |
| 2020/0022543 A1 | 1/2020 | Gill et al. |
| 2020/0022544 A1 | 1/2020 | Gill et al. |
| 2020/0022553 A1 | 1/2020 | Gill et al. |
| 2020/0037833 A1 | 2/2020 | Niedzwecki et al. |
| 2020/0037843 A1 | 2/2020 | Fiebig et al. |

(56) References Cited

U.S. PATENT DOCUMENTS

| | | |
|---|---|---|
| 2020/0046184 A1 | 2/2020 | Freese et al. |
| 2020/0077855 A1 | 3/2020 | Brown et al. |
| 2020/0085267 A1 | 3/2020 | Thorne et al. |
| 2020/0085269 A1 | 3/2020 | Thorne |
| 2020/0121144 A1 | 4/2020 | Gacin et al. |
| 2020/0121148 A1 | 4/2020 | Hoffman et al. |
| 2020/0138260 A1 | 5/2020 | Sutter et al. |
| 2020/0159246 A1 | 5/2020 | Cui et al. |
| 2020/0166949 A1 | 5/2020 | Leech et al. |
| 2020/0170470 A1 | 6/2020 | Liggett et al. |
| 2020/0201348 A1 | 6/2020 | Leech |
| 2020/0205631 A1 | 7/2020 | Brown et al. |
| 2020/0205634 A1 | 7/2020 | Sutter et al. |
| 2020/0237171 A1 | 7/2020 | Xu et al. |
| 2020/0237176 A1 | 7/2020 | Bassa et al. |
| 2020/0288929 A1 | 9/2020 | Brunner |
| 2020/0288930 A1 | 9/2020 | Wells |
| 2020/0297172 A1 | 9/2020 | Tonderys et al. |
| 2020/0301430 A1 | 9/2020 | Irkliy et al. |
| 2020/0315418 A1 | 10/2020 | Howard et al. |
| 2020/0345196 A1 | 11/2020 | Innes et al. |
| 2020/0367711 A1 | 11/2020 | Thorne et al. |
| 2020/0371526 A1 | 11/2020 | Kamada |
| 2020/0383547 A1 | 12/2020 | Sutter et al. |
| 2021/0007569 A1 | 1/2021 | Howard et al. |
| 2021/0022574 A1 | 1/2021 | Harting |
| 2021/0030227 A1 | 2/2021 | Mathieu et al. |
| 2021/0038032 A1 | 2/2021 | Brown |
| 2021/0059495 A1 | 3/2021 | Gill et al. |
| 2021/0085144 A1 | 3/2021 | Woodrow et al. |
| 2021/0169289 A1 | 6/2021 | Thorne et al. |
| 2021/0175772 A1 | 6/2021 | Aini |
| 2021/0177223 A1 | 6/2021 | Der Marderosian et al. |
| 2021/0186282 A1 | 6/2021 | Mathieu et al. |
| 2021/0204684 A1 | 7/2021 | Heman-Ackah et al. |
| 2021/0254615 A1 | 8/2021 | Vrdoljak et al. |
| 2021/0307581 A1 | 10/2021 | Thorne et al. |
| 2021/0315428 A1 | 10/2021 | Udy et al. |
| 2021/0386261 A1 | 12/2021 | Woodrow et al. |
| 2021/0386262 A1 | 12/2021 | Uchendu et al. |
| 2022/0031131 A1 | 2/2022 | McClay et al. |
| 2022/0031133 A1 | 2/2022 | McWilliams |
| 2022/0031134 A1 | 2/2022 | Yang et al. |
| 2022/0061614 A1 | 3/2022 | Yu et al. |
| 2022/0071459 A1 | 3/2022 | Gacin et al. |
| 2022/0095864 A1 | 3/2022 | Der Marderosian et al. |
| 2022/0125256 A1 | 4/2022 | Lessard et al. |
| 2022/0287521 A1 | 9/2022 | Cottrell et al. |
| 2022/0322903 A1 | 10/2022 | Lessard |
| 2022/0400922 A1 | 12/2022 | McClay et al. |
| 2022/0408994 A1 | 12/2022 | Hill |
| 2023/0043567 A1 | 2/2023 | Copeland et al. |
| 2023/0070147 A1 | 3/2023 | Harting et al. |
| 2023/0157495 A1 | 5/2023 | Copeland et al. |
| 2023/0248192 A1 | 8/2023 | Brown et al. |
| 2023/0320550 A1 | 10/2023 | Teuscher et al. |
| 2023/0329502 A1 | 10/2023 | Chirikjian |
| 2023/0355065 A1 | 11/2023 | Finnegan |
| 2023/0414052 A1 | 12/2023 | McClay et al. |
| 2024/0008699 A1 | 1/2024 | Innes et al. |
| 2024/0415352 A1 | 12/2024 | McClay et al. |

FOREIGN PATENT DOCUMENTS

| | | |
|---|---|---|
| CN | 102314176 | 1/2012 |
| CN | 103984315 | 8/2014 |
| CN | 105310604 | 2/2016 |
| CN | 106175615 | 12/2016 |
| CN | 106413501 | 2/2017 |
| CN | 104395849 | 3/2017 |
| CN | 106541407 | 3/2017 |
| CN | 106843202 | 6/2017 |
| CN | 106863305 | 6/2017 |
| CN | 112204345 | 1/2021 |
| DE | 3536974 | 4/1987 |
| DE | 102017104691 | 9/2018 |
| DE | 112016005638 | 9/2018 |
| EP | 1510896 | 3/2005 |
| EP | 1548532 | 6/2005 |
| EP | 2946650 | 11/2015 |
| EP | 3311722 | 7/2018 |
| JP | 2002085305 | 3/2002 |
| JP | 2002354139 | 12/2002 |
| KR | 20080041891 | 5/2008 |
| KR | 20110124652 | 11/2011 |
| KR | 20130027345 | 3/2013 |
| KR | 20130030909 | 3/2013 |
| KR | 101324168 | 11/2013 |
| KR | 101341296 | 12/2013 |
| KR | 101352518 | 1/2014 |
| KR | 101378883 | 3/2014 |
| KR | 20140066850 | 6/2014 |
| KR | 101893152 | 8/2018 |
| WO | 2013071190 | 5/2013 |
| WO | 2014113806 | 7/2014 |
| WO | 2018158248 | 12/2018 |

OTHER PUBLICATIONS

PCT Search Report and Written Opinion mailed Nov. 30, 2022, received in corresponding PCT Application No. PCT/US22/40180, 8 pages.

PCT Search Report and Written Opinion mailed Jul. 25, 2019, received in PCT Application No. PCT/US19/28796, 10 pgs.

US Office Action issued Apr. 15, 2022, received in U.S. Appl. No. 16/392,452, 17 pages.

Extended European Search Report dated Nov. 23, 2022, received in European Patent Application No. 19793164.5, 8 pages.

Chinese Office Action with machine-generated English translation issued May 31, 2023 received in Chinese Patent Application No. 201980040485.8, 24 pages.

Chinese Office Action with machine-generated English translation issued Jun. 27, 2024, received in Chinese Patent Application No. 202280060153.8, 11 pages.

Extended European Search Report issued Oct. 28, 2024, received in European Patent Application No. 22856663.4, 11 pages.

Chinese Office Action with machine-generated English translation issued Jan. 22, 2025, received in Chinese Patent Application No. 202280060153.8, 15 pages.

Chinese Decision of Rejection with machine-generated English translation dated Apr. 17, 2025, received in Chinese Application No. 202280060153.8, 14 pages.

ROBOTIC CLEANER

CROSS-REFERENCE TO RELATED APPLICATIONS

The present application claims the benefit of U.S. Provisional Application Ser. No. 63/232,997, filed on Aug. 13, 2021, entitled Robotic Cleaner, which is fully incorporated herein by reference.

TECHNICAL FIELD

The present disclosure is generally directed to a robotic cleaner and more specifically to a robotic cleaner configured to cooperate with a mobile device such as a mobile phone or tablet.

BACKGROUND INFORMATION

Autonomous cleaning devices (e.g., robotic cleaners) are configured to autonomously traverse (or navigate) a surface while at least partially cleaning the surface. One example of an autonomous cleaning device is a robotic vacuum cleaner. A robotic vacuum cleaner may include a suction motor, a dust cup fluidly coupled to the suction motor, and one or more driven wheels configured to urge the robotic vacuum cleaner across a surface to be cleaned. In operation, the robotic vacuum cleaner traverses the surface to be cleaned while collecting at least a portion of any debris present on the surface to be cleaned.

BRIEF DESCRIPTION OF THE DRAWINGS

These and other features and advantages will be better understood by reading the following detailed description, taken together with the drawings, wherein.

DETAILED DESCRIPTION

The present disclosure is generally directed to a robotic cleaner configured to cooperate with a mobile device. For example, the robotic cleaner may be configured to generate a map of an environment and to communicate the generated map to the mobile device. The mobile device may be configured to localize itself within the map received from the robotic cleaner.

The mobile device may include a display and a camera, wherein the display displays one or more images (e.g., in the form of video) corresponding to a field of view of the camera. The mobile device may be configured to generate one or more augmented reality elements to be displayed over the one or more images. In some instances, the augmented reality elements may be generated in response to one or more user inputs and correspond to a position and/or region within the environment that is shown in the one or more images. Use of an augmented reality element to identify a position and/or region within an environment may be easier and/or more accurate when compared to using a graphical representation (e.g., in the form of a two dimensional map). The identified position and/or region may be localized within the map received from the robotic cleaner (e.g., converted into coordinates within the received map).

For example, a plurality of user inputs may be used identify vertices of a polygon that encloses a region of the environment shown within the one or more images. The resulting polygon may be shown in the one or more images as an augmented reality element. In this example, the enclosed region may be localized within the received map and associated with a command/instruction (e.g., a clean here command/instruction, an avoid command/instruction, a surface type command/instruction, and/or any other command/instruction). The enclosed region may be associated with the command/instruction in response to a user input that interacts with the augmented reality element representing the polygon.

Figure 1:
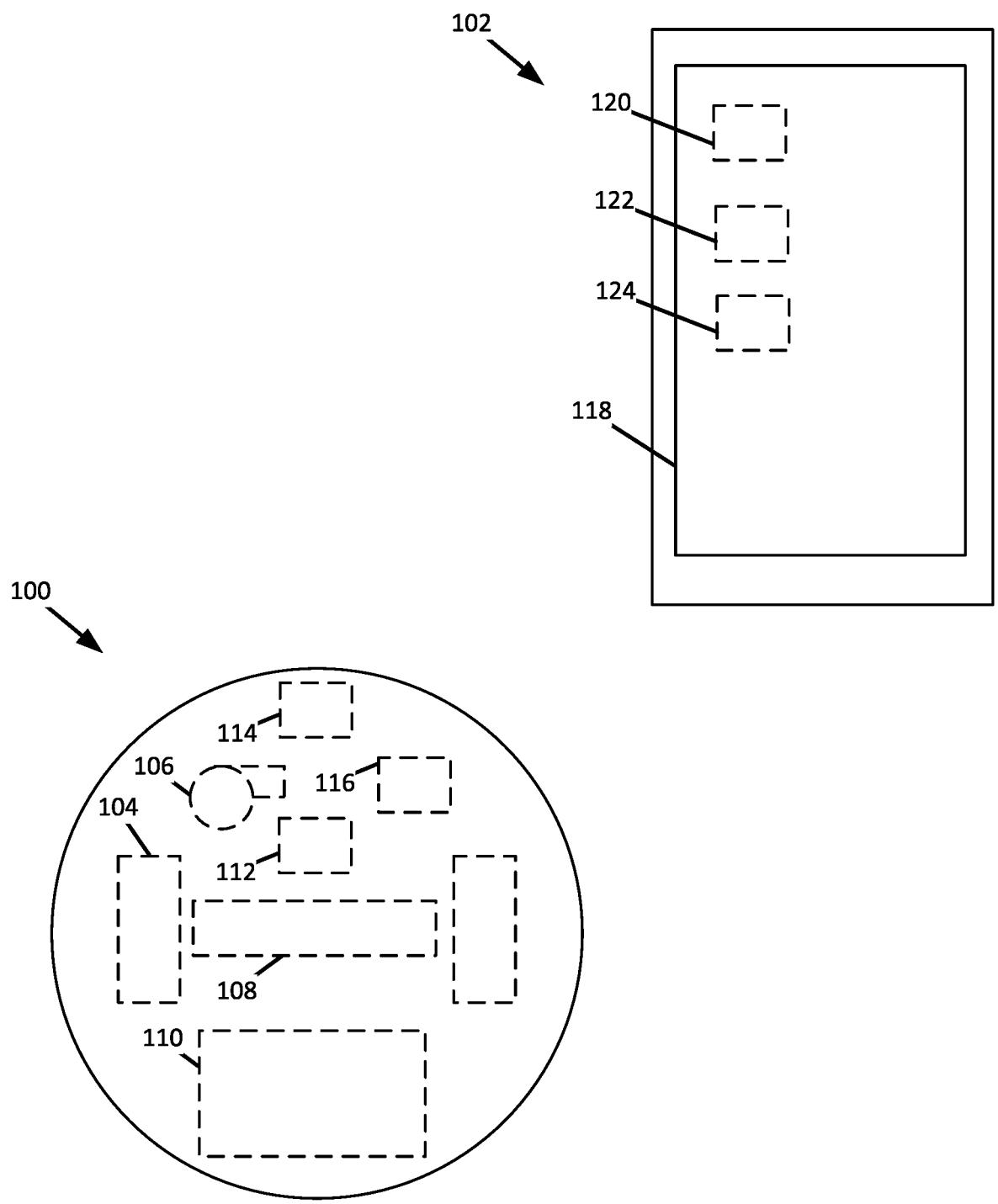
FIG. 1 is a schematic example of a robotic cleaner and a mobile device, consistent with embodiments of the present disclosure.

FIG. 1 shows a schematic example of a robotic cleaner 100 configured to cooperate with a mobile device 102 (e.g., a mobile phone, a tablet computer, a laptop computer, and/or any other type of mobile device). As shown, the robotic cleaner 100 includes one or more driven wheels 104 (shown in hidden lines), a suction motor 106 (shown in hidden lines) fluidly coupled to a suction inlet 108 (shown in hidden lines) and a dust cup 110 (shown in hidden lines), and a robot controller 112 (shown in hidden lines) communicatively coupled to one or more robot sensors 114 (shown in hidden lines) and/or one or more robot transmitters/receivers 116 (shown in hidden lines). In operation, the robot controller 112 is configured to cause the robotic cleaner 100 to autonomously navigate an environment (e.g., a home and/or a room within a home). While navigating the environment, the robotic cleaner 100 may be configured to generate a map of the environment (e.g., using the one or more robot sensors 114).

For example, the robot controller 112 may be configured to receive environmental and/or positional (e.g., orientation) information from at least one of the one or more robot sensors 114. The environmental information may correspond to obstacles (e.g., walls, furniture, and/or any other obstacle) within the environment. The robot controller 112 can use received environmental and/or positional information to generate one or more maps of the environment. Using the generated one or more maps, the robot controller 112 may be configured to generate one or more path plans along which the robotic cleaner 100 may travel when traversing the environment. In some instances, the robot controller 112 can use the one or more maps in conjunction with received environmental and/or positional information for purposes of localization. Localizing the robotic cleaner 100 within the map may allow the robotic cleaner 100 to navigate to specific locations (e.g., a dirty location identified by a user) and/or avoid specific locations (e.g., a region that a user does not want the robotic cleaner 100 to traverse).

The mobile device 102 is configured to communicatively couple to the robotic cleaner 100. As shown, the mobile device 102 includes a display 118, a mobile controller 120 (shown in hidden lines), one or more mobile transmitters/receivers 122 (shown in hidden lines), and one or more mobile sensors 124 (shown in hidden lines). At least one of the one or more mobile transmitters/receivers 122 are configured to communicatively couple (directly or indirectly) with at least one of the one or more robot transmitters/receivers 116. For example, the mobile device 102 may be configured to transmit one or more instructions/commands to the robotic cleaner 100. By way of further example, the robotic cleaner 100 may be configured to transmit data (e.g., the environmental and/or positional information) to the mobile device 102. By way of further example, the robotic cleaner 100 and the mobile device 102 may be configured for bi-directional communication. In this example, the mobile device 102 may be configured to transmit one or more instructions/commands that are based, at least in part, on user input and receive environmental and/or positional information (e.g., in the form of a map) from the robotic cleaner 100.

The mobile controller 120 may be configured to localize the mobile device 102 within an environment using at least one of the one or more mobile sensors 124. In some instances, the mobile device 102 may receive a map of the environment from the robotic cleaner 100 and localize itself within the environment using the received map. For example, the mobile controller 120 may receive environmental information from at least one of the one or more mobile sensors 124 and determine a location of the mobile device 102 within the received map. In this example, the mobile controller 120 may be configured to track movement of the mobile device 102 within the environment in real-time. In some instances, positional changes of the mobile device 102 may be tracked relative to a point (e.g., a position of the robotic cleaner 100). The one or more mobile sensors 124 may, in some instances, be used to modify the received map (e.g., to increase an accuracy of the received map). For example, the one or more mobile sensors 124 may be used to identify obstacle(s), obstacle type(s) (e.g., furniture, walls, and/or any other obstacle type), and/or surface type(s) (e.g., carpet or hard floor) and add this information to the received map, generating a modified map. The modified map may be transmitted to the robotic cleaner 100. In this example, a user may send a command/instruction to clean proximate to a specific piece of furniture that was identified using the mobile sensors 124. The command/instruction may be included with the modified map (e.g., such that the command/instruction is carried out each time the robotic cleaner 100 is proximate the specific piece of furniture) and/or separate from the modified map (e.g., such that the robotic cleaner 100 carries out the command/instruction in response to receipt of the command/instruction and/or incorporates the command/instruction into the map).

The one or more mobile sensors 124 may include, for example, one or more of a camera (e.g., a monocular or stereo camera), a depth sensor (e.g., a light detection and ranging (LIDAR) sensor) configured to generate depth data, an orientation sensor (e.g., compass and/or accelerometer) configured to generate orientation data, and/or any other type of sensor. In one example, the one or more mobile sensors 124 may include a camera and a LIDAR sensor.

Figure 2:
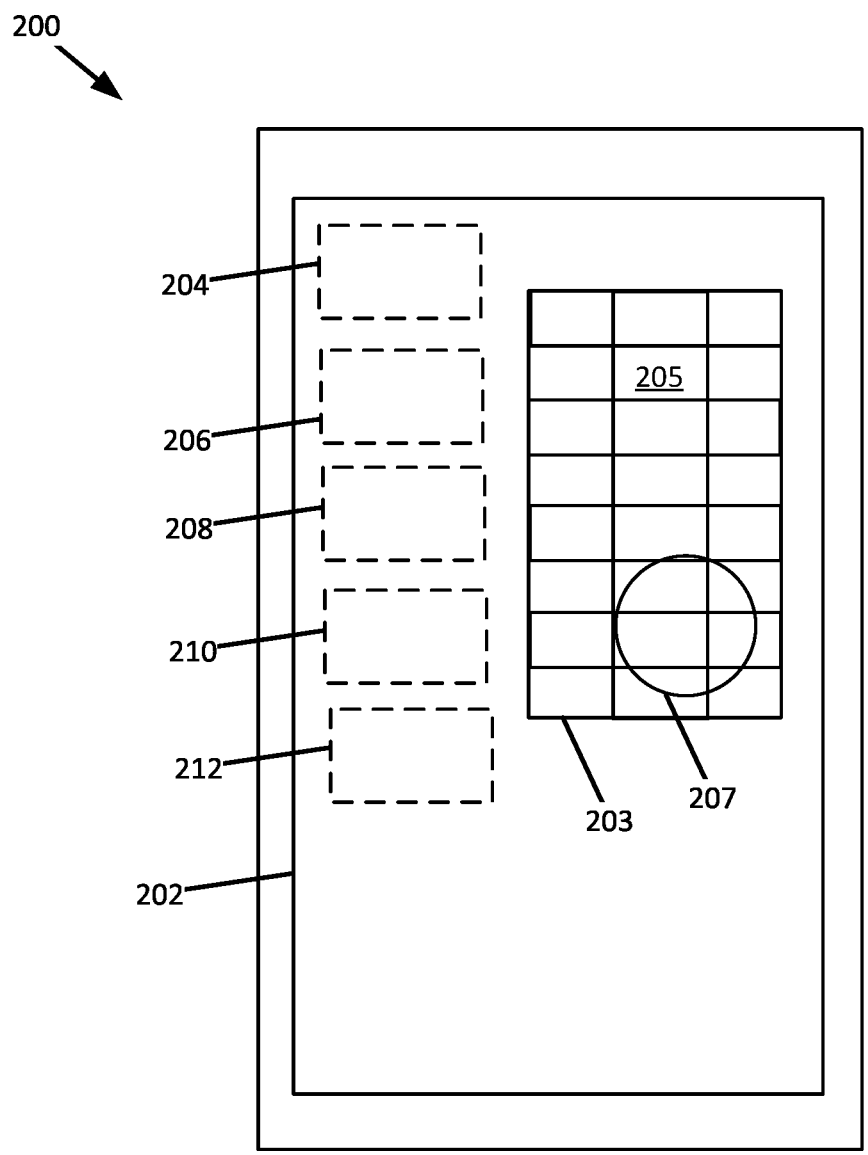
FIG. 2 is a schematic example of a mobile device, consistent with embodiments of the present disclosure.

FIG. 2 shows a schematic example of a mobile device 200, which may be an example of the mobile device 102 of FIG. 2. The mobile device 200 is generally shown in the form of a smartphone. As shown, the mobile device 200 includes a display 202, a camera 204 (shown in hidden lines) opposite the display 202 and configured to generate one or more images of the environment, a depth (e.g., LIDAR) sensor 206 (shown in hidden lines) opposite the display 202 and configured to generate depth data, a wireless mobile transmitter/receiver 208 (shown in hidden lines), an orientation sensor 210 (shown in hidden lines) configured to generate orientation data, and a mobile controller 212 (shown in hidden lines).

The display 202 is configured to display the one or more captured images and to receive one or more user inputs (e.g., touch inputs) while displaying the one or more images. The display 202 may be, for example, a capacitive or resistive touch screen display. The one or more images captured by the camera 204 each include a plurality of pixels, wherein each of the plurality of pixels may be associated with depth data and/or orientation data. When the user touches the display 202, while the one or more captured images are displayed, the user input may be associated with one or more pixels of the one or more images. When a plurality of images are successively displayed (e.g., in the form of a video), the user input may be associated with one or more pixels in each of the images.

The mobile controller 212 is configured to be communicatively coupled to the display 202, the camera 204, the LIDAR sensor 206, the wireless mobile transmitter/receiver 208, and the orientation sensor 210. For example, the mobile controller 212 may be configured to receive environmental data from the camera 204 (e.g., one or more images) and the LIDAR sensor 206 (e.g., depth data corresponding to the received one or more images) and orientation data from the orientation sensor 210 (e.g., a direction the camera 204 is facing when an image is captured). In this example, the mobile controller 212 may be further configured to receive a map generated by the robotic cleaner 100 using the wireless mobile transmitter/receiver 208. The mobile controller 212 may be configured to localize the mobile device 200 within the received map using the depth data received from the LIDAR sensor 206 and/or the orientation data received from the orientation sensor 210.

The mobile controller 212 may be configured to cause an image captured by the camera 204 to be presented on the display 202 (e.g., presented image 203). The presented image 203 may be associated with orientation data from the orientation sensor 210 and depth data from the LIDAR sensor 206. For example, the presented image 203 may include a plurality of pixels 205, wherein each pixel 205 is associated with depth data and orientation data. Association of the presented image 203 with the orientation data and depth data allows a user to assign one or more commands/instructions to a position and/or region shown in the presented image 203 (e.g., the user may touch a position shown within the presented image 203 on the display 202 to assign the command/instruction to that position). In other words, the user input may be used to define a position and/or region with the presented image 203 and associate one or more commands/instructions with the defined position and/or region. In some instances, the mobile controller 212 may be configured to cause the display 202 to display the defined position and/or region as an augmented reality element 207 within the image.

The mobile controller 212 is further configured to localize the defined position and/or region within the received map (e.g., using the depth and orientation data). For example, the mobile controller 212 may be configured to generate a modified map that includes the localized position and/or region. The modified map may further include the command/instruction that is associated with the position and/or region.

By way of further example, the mobile controller 212 can cause the localized position and/or region within the received map to be transmitted to the robotic cleaner 100 (e.g., in the form of coordinates corresponding to the received map). As such, the robotic cleaner 100 can identify the position and/or region associated with the command/instruction and carry out the command/instruction at that position and/or region. The command/instruction may correspond to a robotic cleaner behavior (e.g., a clean here command/instruction, an avoid command/instruction, and/or any other command/instruction).

Figure 3:
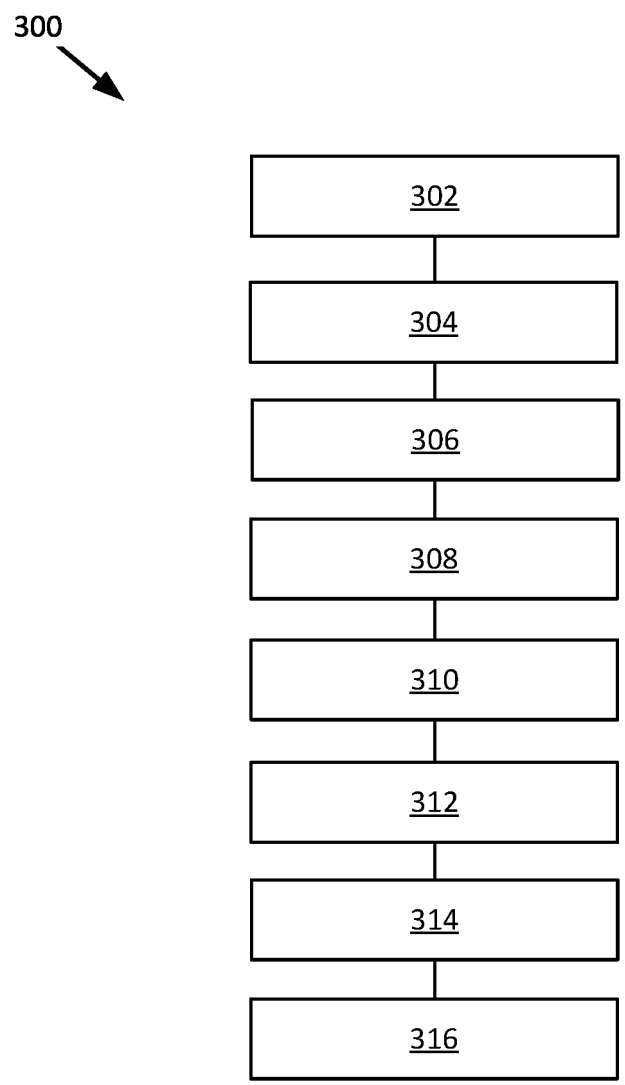
FIG. 3 is a flow chart of an example method, consistent with embodiments of the present disclosure.

FIG. 3 shows a flow chart of an example of a method 300 of controlling a robotic cleaner, such as the robotic cleaner 100 of FIG. 1, using a mobile device, such as the mobile device 102 of FIG. 1. For example, the mobile device 102 may be configured to generate an augmented reality experience such that a user of the mobile device 102 can utilize the augmented reality experience to control one or more behaviors of the robotic cleaner 100. One or more steps of the method 300 may be embodied as one or more instructions stored in one or more memories (e.g., one or more non-transitory memories), wherein the one or more instructions are configured to be executed on one or more processors. For example, the robot controller 112 and/or mobile controller 120 may be configured to cause one or more steps of the method 300 to be carried out. Additionally, or alternatively, one or more steps of the method 300 may be carried out in any combination of software, firmware, and/or circuitry (e.g., an application-specific integrated circuit).

As shown, the method 300 may include a step 302. The step 302 includes receiving, at the mobile device 102, a map of the environment from the robotic cleaner 100.

As also shown, the method 300 may include a step 304. The step 304 includes positioning the robotic cleaner 100 within a field of view of a camera of the mobile device 102. The mobile device 102 (e.g., the mobile controller 120) is configured to recognize the robotic cleaner 100 being within the field of view of the camera. In some instances, a user may summon the robotic cleaner 100 to a position (e.g., a room within a home) that is proximate to the user such that the user may position the robotic cleaner 100 within the field of view of the camera of the mobile device 102. Additionally, or alternatively, the user may travel to the robotic cleaner 100 (e.g., to a position where the robotic cleaner 100 is docked with a docking station) to position the robotic cleaner 100 within a field of view of the camera of the mobile device 102.

As also shown, the method 300 may include a step 306. The step 306 includes, in response to the robotic cleaner 100 being positioned within the field of view of the camera, using a LIDAR sensor of the mobile device 102 to measure a distance between the mobile device 102 and the robotic cleaner 100. Additionally, the mobile device 102 may use an orientation sensor (e.g., a compass and/or an accelerometer) to determine an orientation (e.g., a heading) of the mobile device 102 (e.g., relative to magnetic North) when the robotic cleaner 100 is within the field of view of the camera.

The step 306 may also include, in response to the mobile device 102 (e.g., the mobile controller 120) detecting the robotic cleaner 100 within the image, causing the robotic cleaner 100 to communicate a location of the robotic cleaner 100 within the map to the mobile device 102. For example, the mobile device 102 may query the robotic cleaner 100 for its current location within the map in response to detecting the robotic cleaner 100. In response to the robotic cleaner 100 receiving the query, the robotic cleaner 100 may communicate its location within the map to the mobile device 102.

As also shown, the method 300 may include a step 308. The step 308 includes localizing the mobile device 102 within the map received from the robotic cleaner 100. Localizing the mobile device 102 within the map may include localizing the mobile device 102 relative to the robotic cleaner 100 and determining a location of the robotic cleaner 100 within the map. Localizing the mobile device 102 relative to the robotic cleaner 100 may include determining a position and orientation of the mobile device 102 relative to the robotic cleaner 100 (e.g., using the depth and orientation data). The location of the robotic cleaner 100 within the map may be known by the robotic cleaner 100 (e.g., stored in the map). For example, the location of the robotic cleaner 100 within the map may be determined by querying the robotic cleaner 100 (e.g., as discussed in relation to step 306). As such, the mobile device 102 may be configured to determine the position of the robotic cleaner 100 based, at least in part, on data received from the robotic cleaner 100.

As also shown, the method 300 may include a step 310. The step 310 may include tracking a position and orientation of the mobile device 102 as the mobile device 102 is moved about an environment (e.g., by a user). As such, a positional and orientational change of the mobile device 102 relative to the robotic cleaner 100 may be tracked.

In some instances, the robotic cleaner 100 may be configured to follow the user as the user travels within the environment with the mobile device 102. For example, the mobile device 102 may transmit the position and orientation of the mobile device 102 to the robotic cleaner 100 in real-time and/or at periodic intervals to allow the robotic cleaner 100 to follow the user. If the mobile device 102 loses localization, the user may be able to more easily re-localize the mobile device 102 using the robotic cleaner 100, when robotic cleaner 100 follows the user. For example, the mobile device 102 may re-localize by carrying out steps 304, 306, and 308 without having the user return to the location of the robotic cleaner 100. Additionally, or alternatively, when the mobile device 102 loses localization, the robotic cleaner 100 may be summoned to a location proximate to the user (e.g., to a room that the user is in) such that steps 304, 306, and 308 can be carried out to re-localize the mobile device 102. Re-localizing by positioning the robotic cleaner 100 proximate to the user may mitigate the risk of the mobile device 102 losing localization when the user returns to traversing the environment where localization was initially lost.

As also shown, the method 300 may include a step 312. The step 312 includes displaying on the display 118 of the mobile device 102, one or more images (e.g., in the form of video) corresponding to the field of view of the camera, while the mobile device 102 is moved within the environment. In some instances, the mobile device 102 may be configured to cause one or more augmented reality elements to be displayed over the image on the display 118 (e.g., a menu having one or more options, a position and/or region identified by the user, and/or any other augmented reality element). For example, the mobile device 102 (e.g., mobile controller 120) may be configured to carry out object recognition to identify one or more objects (e.g., an area rug, furniture, wires, and/or any other object) within the image. The identified objects may be identified to the user within the image using an augmented reality element displayed on the display 118. By way of further example, the mobile device 102 may be configured to display a region within the image, wherein the region is generated by user inputs (e.g., a user drawing the region on the display 118). One or more of the identified regions and/or objects may be associated with a command/instruction. The command/instruction associated with the identified regions and/or objects may be displayed to the user as an augmented reality element on the display 118.

As also shown, the method 300 may include a step 314. The step 314 includes receiving, from a user, an input. The input may be received by the user touching the display 118.

For example, the display 118 may display one or more images (e.g., in the form of video) corresponding to a portion of the environment within the field of view of the camera of the mobile device 102 and the user may touch one or more locations within the image. In this example, the user may touch three or more locations and the mobile controller 120 may be configured to generate a polygon that encloses a region based, at least in part, on the locations identified by the user's touch. Each location on the display 118 touched by the user may correspond to one or more pixels of the image, wherein each pixel is associated with depth and orientation data. The generated polygon may be displayed on the display 118 as an augmented reality element. In some instances, the mobile controller 120 may be configured to display the touched point on the display 118 and/or to show a line segment that extends between two successive touch points. In these instances, the user may be provided with feedback in real-time. The region enclosed by the polygon may have a command/instruction associated therewith. For example, the command/instruction may include an avoid region command/instruction, a clean region command/instruction, and/or any other command/instruction. By way of further example, the user may associate the region with a surface type (e.g., carpet or hard floor), wherein the robotic cleaner 100 carries out a command/instruction corresponding to the surface type (e.g., avoid carpet surface types when wet cleaning). The user may associate a command/instruction with the surface type and/or the command/instruction associated with the surface type may be predetermined (e.g., during manufacture of the robotic cleaner 100).

By way of further example, the display 118 may display one or more images (e.g., in the form of video) corresponding to a portion of the environment within the field of view of the camera of the mobile device 102 and the user may touch one or more locations within the image. In this example, the user may touch locations on the image corresponding to objects identified by the mobile device 102 (e.g., using object recognition). The objects identified using object recognition may include an area rug, furniture, wires, and/or any other object. The identified objects may be associated with an augmented reality element (e.g., providing confirmation to a user that an object was identified).

In response to the user touching the identified object within the image (e.g., touching an augmented reality element shown within the image), the mobile device 102 may be configured to associate a command/instruction with the identified object. For example, when the identified object corresponds to an area rug, the command/instruction may include an avoid command/instruction when the robotic cleaner 100 is engaging in a wet cleaning mode. By way of further example, when the identified object corresponds to one or more wires, the mobile device 102 may be configured to associate an avoid command/instruction with the region surrounding the one or more wires, wherein the avoid command/instruction is adhered to by the robotic cleaner 100 regardless of cleaning mode.

By way of still further example, the display 118 may be caused to display a clean at current user location augmented reality element (e.g., an icon) to the user over the one or more images corresponding to the field of view of the camera of the mobile device 102. In response to the user touching the clean at current user location augmented reality element, the robotic cleaner 100 may be caused to travel to a location proximate to where the user touched the clean at current user location augmented reality element and clean a region enclosing the location where and/or the room within which the clean at current user location augmented reality element was touched. The robotic cleaner 100 can be configured to determine a current location of the user based on the localized position of the mobile device 102 within the map.

As also shown, the method 300 may include a step 316. The step 316 includes localizing the object and/or the enclosed region within the received map based, at least in part, the orientation data and the depth data. For example, the mobile controller 120 can be configured to calculate a distance (e.g., a horizontal distance) between the mobile device 102 and each point defining polygon enclosing the region (e.g., using the depth and orientation data associated with the pixels corresponding to a location of the image touched by the user on the display 118). Based, at least in part, on the calculated distance and the orientation data a position of each point of the polygon enclosing the region may be determined within the map. In other words, the three-dimensional data defining the location of the boundary of the enclosed region is converted into two-dimensional data. By way of further example, the mobile controller 120 can be configured to localize the identified objects within the map received from the robotic cleaner 100 using the depth and orientation data.

A command/instruction can be associated with the identified object and/or the defined region. In response to a command/instruction being associated with the identified object and/or the defined region, the mobile controller 120 may be configured to generated a modified map that includes the identified object, the defined region, and/or the associated command/instruction. The mobile controller 120 can be configured to cause the modified map to be transmitted to the robotic cleaner 100.

Figure 4:
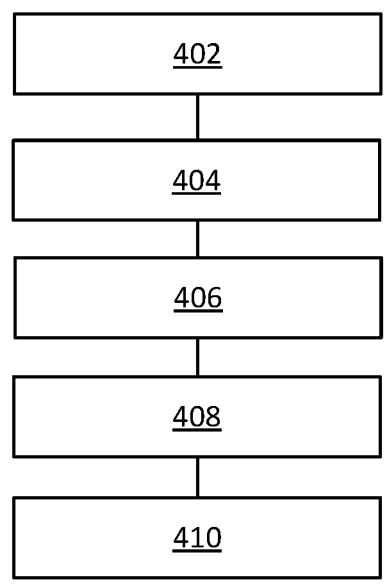
FIG. 4 is a flow chart of an example method, consistent with embodiments of the present disclosure.

FIG. 4 shows a flow chart of an example of a method 400 of controlling a robotic cleaner, such as the robotic cleaner 100 of FIG. 1, using a mobile device, such as the mobile device 102 of FIG. 1. One or more steps of the method 400 may be embodied as one or more instructions stored in one or more memories (e.g., one or more non-transitory memories), wherein the one or more instructions are configured to be executed on one or more processors. For example, the robot controller 112 and/or mobile controller 120 may be configured to cause one or more steps of the method 400 to be carried out. Additionally, or alternatively, one or more steps of the method 400 may be carried out in any combination of software, firmware, and/or circuitry (e.g., an application-specific integrated circuit).

As shown, the method 400 may include a step 402. The step 402 includes positioning the robotic cleaner 100 within a field of view of a camera of the mobile device 102. The mobile device 102 is configured to recognize the robotic cleaner 100 being within the field of view of the camera.

As also shown, the method 400 may include a step 404. The step 404 includes, in response to the robotic cleaner 100 being positioned within the field of view of the camera, using a LIDAR sensor of the mobile device 102 to measure a distance between the mobile device 102 and the robotic cleaner 100. Additionally, the mobile device 102 may use an orientation sensor (e.g., a compass and/or an accelerometer) to determine an orientation (e.g., a heading) of the mobile device 102 (e.g., relative to magnetic North) when the robotic cleaner 100 is within the field of view of the camera.

As also shown, the method 400 may include a step 406. The step 406 includes determining a position and orientation of the mobile device 102 relative to the position and orientation of the robotic cleaner 100 (e.g., using the orientation and depth data).

As also shown, the method 400 may include a step 408. The step 408 includes tracking a position and orientation of the mobile device 102 as the mobile device 102 is moved about an environment (e.g., by a user). As such, a positional and orientational change of the mobile device 102 relative to the robotic cleaner 100 may be tracked.

As also shown, the method may include a step 410. The step 410 includes causing the robotic cleaner 100 to follow the user as the user travels within the environment with the mobile device 102. For example, the mobile device 102 may transmit the change in position and orientation of the mobile device 102 relative to the robotic cleaner 100 to the robotic cleaner 100 in real-time and/or at periodic intervals to allow the robotic cleaner 100 to follow the user.

As also shown, the method may include a step 410. The step 410 includes issuing a command/instruction to the robotic cleaner 100. The issued command/instruction is associated with the location of the robotic cleaner 100 within the environment. For example, the command/instruction may include causing the robotic cleaner 100 to identify the current location as a room within a home (e.g., the robotic cleaner 100 may identify the walls defining the room using the one or more robot sensors 114 and/or using data transmitted from the mobile device 102 that is generated using the one or more mobile sensors 124). By way of further example, the command/instruction may include causing the robotic cleaner 100 to clean a room within which the robotic cleaner 100 is currently disposed and/or to add the room within which the robotic cleaner 100 is currently disposed to a list of rooms to be cleaned. In this example, the robotic cleaner 100 may have a previously generated map of the entire environment (e.g., a floor of a home) in which two or more rooms are identified.

Figure 5:
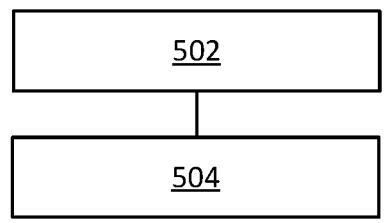
FIG. 5 is a flow chart of an example method, consistent with embodiments of the present disclosure.

FIG. 5 shows a flow chart of an example of a method 500 of controlling a robotic cleaner, such as the robotic cleaner 100 of FIG. 1, using a mobile device, such as the mobile device 102 of FIG. 1. For example, the mobile device 102 may be configured to communicate with the robotic cleaner 100, wherein the mobile device 102 may, in response to a user input, issue a command/instruction that causes the robotic cleaner 100 to avoid a region (e.g., a room) and/or operate in a reduced noise mode when traveling through a region where the user is located. In some instances, the region where the user is located may be determined based, at least in part, on a location of the mobile device 102. One or more steps of the method 500 may be embodied as one or more instructions stored in one or more memories (e.g., one or more non-transitory memories), wherein the one or more instructions are configured to be executed on one or more processors. For example, the robot controller 112 and/or mobile controller 120 may be configured to cause one or more steps of the method 500 to be carried out. Additionally, or alternatively, one or more steps of the method 500 may be carried out in any combination of software, firmware, and/or circuitry (e.g., an application-specific integrated circuit).

As shown, the method 500 may include a step 502. The step 502 includes determining, with the robotic cleaner 100, a location of a user and/or the mobile device 102. The location of the mobile device 102 may be determined based, at least in part, on one or more of a user input (e.g., the user specifies a room within the house that the user is occupying), a localization of the mobile device 102 within a map using the one or more mobile sensors 124 of the mobile device 102, and/or a strength of a signal generated by the mobile device 102 (e.g., a signal generated by the one or more mobile transmitters/receivers 122). For example, the mobile device 102 may be configured to transmit a location of the mobile device 102 and/or the user within an environment (e.g., a home) to the robotic cleaner 100. By way of further example, the robotic cleaner 100 may measure a signal strength of a signal (e.g., a WiFi signal, a Bluetooth signal, and/or the like) generated by the one or more mobile transmitters/receivers 122 of the mobile device 102 to determine a proximity of the robotic cleaner 100 to the mobile device 102.

As shown, the method 500 may include a step 504. The step 504 includes avoiding a region that encloses a user and/or the mobile device 102 and/or operating in a reduced noise mode when traveling through a region that encloses the user and/or the mobile device 102. The region may be determined based, at least in part, on the determined location of the user and/or the mobile device 102. In some instances, the region may correspond to a fixed distance extending around the user and/or the mobile device 102 and/or correspond to a room within which the user and/or the mobile device 102 is in. The reduced noise mode may cause the robotic cleaner 100 to transition to a lower powered cleaning mode (e.g., by reducing a suction force generated by the suction motor, reducing a rotation speed of a rotating agitator, and/or the like).

An example of a robotic cleaning system, consistent with the present disclosure, may include a robotic cleaner configured to generate a map of an environment and a mobile device configured to communicatively couple to the robotic cleaner, the robotic cleaner configured to communicate the map to the mobile device. The mobile device may include a camera configured to generate an image of the environment, the image comprising a plurality of pixels, a display configured to display the image and to receive a user input while displaying the image, the user input being associated with one or more of the plurality of pixels, a depth sensor configured to generate depth data that is associated with each pixel of the image, an orientation sensor configured to generate orientation data that is associated with each pixel of the image, and a mobile controller configured to localize the mobile device within the map received from the robotic cleaner using the depth data and the orientation data.

In some instances, the user input may be used to define a region within the displayed image. In some instances, the mobile controller may be configured to localize the defined region within the map received from the robotic cleaner using the depth data and the orientation data associated with the one or more pixels that are associated with the user input. In some instances, a command/instruction may be associated with the defined region. In some instances, the mobile controller may be configured to generate a modified map, the modified map including the defined region and the command/instruction associated with the defined region. In some instances, the modified map may be communicated to the robotic cleaner. In some instances, the defined region may be displayed within the image as an augmented reality element. In some instances, the mobile controller may be configured to detect when the robotic cleaner is within the image. In some instances, in response to the mobile controller detecting the robotic cleaner within the image, the robotic cleaner may be configured to communicate a location of the robotic cleaner within the map of the environment to the mobile device. In some instances, the mobile controller may be configured to use the depth data and the orientation data to localize the mobile device relative to the robotic cleaner. In some instances, the mobile controller may be configured to localize the mobile device within the map received from the robotic cleaner based on the localization of the mobile device relative to the robotic cleaner. In some instances, the mobile controller may be configured to recognize an object within the image. In some instances, the mobile controller may localize the recognized object within the map received from the robotic cleaner using the depth data and the orientation data. In some instances, the display may be configured to display an augmented reality element associated with the recognized object. In some instances, in response to the user input interacting with the augmented reality element, a command/instruction may be associated with the recognized object. In some instances, the mobile controller may be configured to generate a modified map, the modified map including the recognized object and the command/instruction associated with the recognized object. In some instances, the modified map may be communicated to the robotic cleaner. In some instances, the camera may be configured to generate a plurality of images and the display is configured to display the plurality of images as a video and receive the user input while displaying the video. In some instances, the display may receive at least three user inputs, the at least three user inputs being used define a polygonal region, the polygonal region being displayed within the video as an augmented reality element. In some instances, the depth sensor may include a light detection and ranging (LIDAR) sensor and the orientation sensor may include a compass.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A robotic cleaning system comprising:
    a robotic cleaner configured to generate a map of an environment; and
    a mobile device configured to communicatively couple to the robotic cleaner, the robotic cleaner configured to communicate the map to the mobile device, wherein the mobile device includes:
        a camera configured to generate an image of the environment, the image comprising a plurality of pixels;
        a display configured to display the image and to receive a user input while displaying the image, the user input being associated with one or more of the plurality of pixels;
        a depth sensor configured to generate depth data that is associated with each pixel of the image;
        an orientation sensor configured to generate orientation data that is associated with each pixel of the image; and
        a mobile controller configured to localize the mobile device within the map received from the robotic cleaner using the depth data and the orientation data;
        wherein the mobile controller is configured to recognize an object within the image;
        wherein the mobile controller localizes the recognized object within the map received from the robotic cleaner using the depth data and the orientation data;
        wherein the display is configured to display an augmented reality element associated with the recognized object.

2. The robotic cleaning system of claim 1, wherein the user input is used to define a region within the displayed image.

3. The robotic cleaning system of claim 2, wherein the mobile controller is configured to localize the defined region within the map received from the robotic cleaner using the depth data and the orientation data associated with the one or more pixels that are associated with the user input.

4. The robotic cleaning system of claim 3, wherein a command/instruction is associated with the defined region.

5. The robotic cleaning system of claim 4, wherein the mobile controller is configured to generate a modified map, the modified map including the defined region and the command/instruction associated with the defined region.

6. The robotic cleaning system of claim 5, wherein the modified map is communicated to the robotic cleaner.

7. The robotic cleaning system of claim 2, wherein the defined region is displayed within the image as an augmented reality element.

8. The robotic cleaning system of claim 1, wherein the mobile controller is configured to detect when the robotic cleaner is within the image.

9. The robotic cleaning system of claim 8, wherein, in response to the mobile controller detecting the robotic cleaner within the image, the robotic cleaner is configured to communicate a location of the robotic cleaner within the map of the environment to the mobile device.

10. The robotic cleaning system of claim 9, wherein the mobile controller is configured to use the depth data and the orientation data to localize the mobile device relative to the robotic cleaner.

11. The robotic cleaning system of claim 10, wherein the mobile controller is configured to localize the mobile device within the map received from the robotic cleaner based on the localization of the mobile device relative to the robotic cleaner.

12. The robotic cleaning system of claim 1, wherein, in response to the user input interacting with the augmented reality element, a command/instruction is associated with the recognized object.

13. The robotic cleaning system of claim 12, wherein the mobile controller is configured to generate a modified map, the modified map including the recognized object and the command/instruction associated with the recognized object.

14. The robotic cleaning system of claim 13, wherein the modified map is communicated to the robotic cleaner.

15. The robotic cleaning system of claim 1, wherein the camera is configured to generate a plurality of images and the display is configured to display the plurality of images as a video and receive the user input while displaying the video.

16. The robotic cleaning system of claim 15, wherein the display receives at least three user inputs, the at least three user inputs being used define a polygonal region, the polygonal region being displayed within the video as an augmented reality element.

17. The robotic cleaning system of claim 1, wherein the depth sensor includes a light detection and ranging (LIDAR) sensor and the orientation sensor includes a compass.

* * * * *